United States Patent
Kaiser et al.

(10) Patent No.: US 8,624,448 B2
(45) Date of Patent: Jan. 7, 2014

(54) ELECTRODYNAMIC LINEAR OSCILLATING MOTOR

(75) Inventors: Gunter Kaiser, Dresden (DE); Juergen Klier, Dresden (DE)

(73) Assignee: Institute fuer Luft- und Kaeltetechnik gemeinnutzige GmbH, Dresden (DE)

( * ) Notice: Subject to any disclaimer, the term of this patent is extended or adjusted under 35 U.S.C. 154(b) by 0 days.

(21) Appl. No.: 13/110,438

(22) Filed: May 18, 2011

(65) Prior Publication Data

US 2011/0278963 A1 Nov. 17, 2011

Related U.S. Application Data

(63) Continuation of application No. PCT/DE2009/001554, filed on Nov. 4, 2009.

(30) Foreign Application Priority Data

Nov. 18, 2008 (DE) .......................... 10 2008 057 954
Dec. 9, 2008 (DE) .......................... 10 2008 061 205

(51) Int. Cl.
*H02K 33/00* (2006.01)
*H02K 33/18* (2006.01)
*H02K 35/04* (2006.01)

(52) U.S. Cl.
USPC ......... 310/15; 310/12.16; 310/12.25; 310/28; 318/119

(58) Field of Classification Search
USPC ................... 310/14–15, 36, 28, 12.24–12.25; 318/119, 124, 126; 335/222
See application file for complete search history.

(56) References Cited

U.S. PATENT DOCUMENTS

| | | | |
|---|---|---|---|
| 3,018,467 A * | 1/1962 | Harris | 367/153 |
| 3,910,729 A | 10/1975 | Jepsen et al. | |
| 4,227,100 A * | 10/1980 | Ezekiel et al. | 310/13 |
| 4,363,980 A * | 12/1982 | Petersen | 310/15 |
| 4,494,022 A * | 1/1985 | Kawara et al. | 310/14 |
| 4,837,467 A * | 6/1989 | Newman | 310/12.18 |
| 5,060,959 A | 10/1991 | Davis et al. | |
| 5,231,336 A * | 7/1993 | van Namen | 318/128 |
| 5,231,337 A * | 7/1993 | van Namen | 318/128 |
| 5,345,206 A * | 9/1994 | Morcos | 335/222 |
| 5,434,549 A * | 7/1995 | Hirabayashi et al. | 335/229 |

(Continued)

FOREIGN PATENT DOCUMENTS

| | | |
|---|---|---|
| DE | 102004010403 A1 | 9/2005 |
| EP | 1158547 A2 | 11/2001 |

(Continued)

*Primary Examiner* — Burton Mullins
(74) *Attorney, Agent, or Firm* — Patricia M. Mathers

(57) ABSTRACT

The invention is an electrodynamic linear oscillating motor, which has high power densities in the magnet gap, a high efficiency, and magnetically restores the oscillating system to a center position. The linear oscillating motor has a stator system, which has at least one magnet, and an oscillating system, which is movably mounted in the magnetic field of the stator. The oscillating system has at least one core made of a soft magnetic material, and at least one driving coil. The electrodynamic linear motor combines the advantages of the known moving coil and moving magnet linear motor, achieving electrodynamic conversion levels of up to 99%. The motor is suited as a drive for refrigerating and air conditioning systems having low power and also for pumping and injection systems, and, reversing the electrodynamic principle, as a generator, such as for shock absorber systems in a motor vehicle.

14 Claims, 1 Drawing Sheet

(56) References Cited

U.S. PATENT DOCUMENTS

| | | | |
|---|---|---|---|
| 5,719,451 A * | 2/1998 | Cook et al. | 310/12.27 |
| 5,896,076 A * | 4/1999 | van Namen | 335/229 |
| 5,912,622 A * | 6/1999 | Endo et al. | 340/572.5 |
| 5,952,743 A * | 9/1999 | Sidey | 310/12.24 |
| 5,973,422 A * | 10/1999 | Clamme | 310/36 |
| 6,105,943 A * | 8/2000 | Nagasawa | 267/140.14 |
| 6,290,308 B1 | 9/2001 | Zitzelsberger | |
| 6,831,538 B2 * | 12/2004 | Godkin | 335/222 |
| 6,867,511 B2 * | 3/2005 | Fukunaga et al. | 310/12.24 |
| 6,914,351 B2 * | 7/2005 | Chertok | 310/12.26 |
| 7,768,160 B1 * | 8/2010 | Sahyoun | 310/14 |
| 8,193,885 B2 * | 6/2012 | Godkin | 335/229 |
| 2006/0208839 A1 | 9/2006 | Taylor | |

FOREIGN PATENT DOCUMENTS

| | | | | |
|---|---|---|---|---|
| EP | 1359304 A1 | 11/2003 | | |
| FR | 2721150 | * 12/1995 | | H02K 33/18 |
| FR | 2721150 A1 | 12/1995 | | |
| GB | 2344622 A | 6/2000 | | |
| JP | 2002031054 A | 1/2002 | | |
| WO | 9850999 A1 | 11/1998 | | |
| WO | 2008046846 A1 | 4/2008 | | |

* cited by examiner

ELECTRODYNAMIC LINEAR OSCILLATING MOTOR

BACKGROUND INFORMATION

1. Field of the Invention

The invention relates to an electrodynamic linear oscillating motor. More particularly, the invention relates to a linear oscillating motor that is particularly well suited for use as a drive in refrigeration and air-conditioning equipment requiring low output and for pump, injection, and shock-absorption systems in motor vehicles.

2. Discussion of the Prior Art

The compressors of low-power refrigeration and air-conditioning systems, as used in particular in household applications, are usually reciprocating compressors. For economic reasons, rotary compressors, for example, scroll compressors, are only used for equipment having a drive output of several kilowatts.

Reciprocating compressors are usually driven by electric motors which produce a rotary motion and, consequently, crank mechanisms are required to convert this rotary motion into the translational or reciprocating motion required for operation of the reciprocating compressors. Slider cranks that eliminate the frictional forces between the piston and the cylinder liner are, without the need for technically complex crosshead mechanisms that are needed with other crank mechanisms, are used for this. The use of slider cranks achieves high resistance to wear and a long service life of the drives. The drawback is that such systems achieve a low efficiency of less than 50% to 70%, because approx. 80% of the total friction occurs in the crank mechanism (in the slider crank) and also because typically rotary electric motors with low efficiency ratings between 50 and 70% are used.

Linear direct drives developed for reciprocating compressors have been available for a number of years now. For cost reasons, electromagnetic linear motors (Maxwell motors) are primarily used for household refrigeration systems. Also, the field of linear drive technology for gas refrigeration machines is familiar with electrodynamic linear motors that produce very low temperatures. These motors have either a moving permanent magnet (MM) or a moving coil (MC).

In a Maxwell linear motor, based on the principle of minimization of the magnetic field energy, a magnetically soft core is drawn into a coil when a voltage is applied to the coil. This principle, therefore, requires that springs or similar force elements be used to return the core to its resting position when the voltage is reduced. Inherent to the use of Maxwell linear motors to drive reciprocating compressors, is that a high proportion of the drive energy is lost in the springs.

By contrast, electrodynamic linear motors can achieve significantly higher degrees of conversion efficiency, between 60 and 90%, depending on the output class. These motors are driven by the Lorentz force, the magnitude and direction of which are dependent on the strength and polarity of the applied operating voltage; these motors can thus be driven directly on AC voltages. Nevertheless, both MM motors and MC motors suffer certain design-related disadvantages.

MC motors/actuators have the advantage that a large permanent magnet (GB 2 344 622 A and US 2006/208839 A1) or electromagnet (WO 98/50999 A1) can be used in the stator circuit, which high magnetic flux densities in the magnet gap and high drive forces are achievable. MC motors are thus well suited as a drive for a low-speed, high-power oscillating systems, such as are needed to operate reciprocating compressors. A disadvantage, however, is that there is no magnetic position reset. Furthermore, movable power supply leads are required, though this disadvantage can be overcome to a large extent by way of a low-fatigue design.

Prior art publications EP 1 158 547 A2, DE 10 2004 010 403 A1, WO 2008/046849 A1, and JP 2002031054 A disclose the use of MM linear motors (or actuators) as drives for reciprocating compressors. Because of the reluctance force (principle of minimization of the magnetic field energy), MM linear motors provide the advantage of a system-inherent return of the oscillating system to its center position, which allows fatigue-prone mechanical reset systems, such as springs, to be eliminated. Movable power supply leads are also not necessary. MM linear motors have the disadvantage, however, that the magnetic flux density in the magnet gap of the motor is relatively low, because the permanent magnet in the movable system must be constructed as small and light as possible, in order not to impair the kinetics of the oscillating system. The resulting reduced drive forces can possibly be compensated with higher speeds of the oscillating system, but high speeds of the oscillating system are undesired in some uses, for example, as the drive of a reciprocating compressor.

FR 2 721 150 A1 discloses a multipolar system for electrodynamically generating oscillation, the system comprising a stator system and an oscillating system. The stator comprises a pole piece on which two magnets with opposing polarity are mounted. The oscillating system comprises two coils wound onto a pole piece that is supported such as to allow oscillating motion.

The movable pole piece, with a constant cross-section, protrudes far beyond the two magnets of the stator system, and because of this, practically no reluctance force acts on the oscillating system when the coils are de-energized, even if the movable pole piece is made of a magnetically soft material, that is, the oscillating system is not returned to its park/center position. The system design is furthermore relatively complicated; it requires, in particular, two cost-intensive, radially magnetized permanent magnets. Furthermore, the design of the magnet circuit is disadvantageous in that it does not permit flux concentration in the magnet gap, which makes it impossible for such motors to achieve high force and power densities.

BRIEF SUMMARY OF THE INVENTION

The invention is an electrodynamic linear oscillating motor characterized by high power densities in the magnet gap, magnetic return of the oscillating system to the center position, and an oscillating system that has a comparatively low weight. The linear oscillating motor according to the invention achieves high drive powers at low speeds of the oscillating system.

The electrodynamic linear oscillating motor comprises a stator system that has at least one magnet, and an oscillating system that is supported such that it is movable in the magnetic field of the stator.

The oscillating system of the motor according to the invention has at least one core of a magnetically soft material, e.g. a ferrite, and at least one coil. The oscillating system is designed such that, if at least one drive coil is de-energized, it is returned to the center position by way of a reluctance force acting on the oscillating system.

It is intended that the magnet of the stator system of an electrodynamic linear oscillating motor according to the invention be constructed as a large and strong magnet, as in the case of the currently known MC motors, so that a high magnetic flux density is achieved in the magnet gap of the motor. The motor is then operable at high drive powers, with the oscillating system at low speed.

The system of the linear motor according to the invention comprises a core of soft magnetic material, the reluctance force inherent to the system effect a return of the oscillating to its center position. Consequently fatigue-prone mechanical reset systems, such as springs, are not needed and can be eliminated.

In principle, the core of the oscillating system of the linear motor may be designed such that it is significantly lighter than the permanent magnets of MM motors, although the oscillating system comprising a core and at least one coil is heavier than the plunger coils of MC motors.

An electrodynamic linear motor according to the invention thus combines to a large extent the advantages of the known MC and MM linear motors.

In a preferred embodiment, the stator system is constructed as an annular-disk-shaped magnet, magnetized in the axial direction, with a ring-shaped pole disk made of a magnetically soft material located at each of the two end faces of the magnet. The inner and outer diameters of the pole disks and those of the annular-disk-shaped magnet are identical. The oscillating system is concentric and held inside the stator system such that it is movable in the axial direction. It has a magnetically soft core, onto which two separate drive coils are wound, such that the coils, when the oscillating system is in its center position, are each located in one of the magnet gaps formed by the pole disks in conjunction with the disk-shaped magnet. The orientation of the windings of the two drive coils is such that the Lorentz forces acting on the coils are cumulative when the motor is operated, i.e., the coils are would opposite each other.

The core of the oscillating system is preferably cylindrical in form, whereby the outer diameter of the oscillating system, which includes the two coils wound on the core, is smaller than the inner diameter of the pole disks.

The oscillating system of the motor can be configured, especially for use in refrigeration systems and according to the conventional rule of thumb, "stroke=inner diameter", such that the stroke of the motor corresponds approximately to the inner diameter of the stator magnet. Stroke length for compressor drives in household refrigeration units is approx. 10 to 20 mm.

Depending on the size/power of the linear motor according to the invention, efficiencies of up to 99% may be achieved. Here the rule is that the greater the power of the linear motor, the higher its efficiency.

The linear oscillating motor according to the invention is therefore very well suited both as a drive motor for the reciprocating compressors of air-conditioning and refrigeration systems and for single- or dual-piston linear compressors in gas refrigeration machines that are used to generate very low temperatures.

Furthermore, the motor can be used advantageously as a drive motor in the automobile industry, for example, as a pump for fuel, engine oil, cooling water or hydraulic fluid. It is possible to control the linear oscillating motor very quickly. This makes it suitable for use to control fuel injection in combustion engines. To this end, each mechanical valve may be replaced by a valve controlled by means of a linear oscillating motor, and the camshaft control be replaced by fully electronic control.

Because the electrodynamic drive principle is reversible, the linear oscillating motor according to the invention may also be operated as a linear generator that is particularly well-suited for generating electrical energy generation from drive systems with high power and short stroke, such as, for example, free-piston Stirling engines.

A further application, in which the linear oscillating motor acts simultaneously as drive and generator, involves use of the motor as a damper for the independent wheel suspensions in motor vehicles. The magnitude of the damping may be controlled by means of the electrical load that is applied to the coils of the oscillating system. It may also be advantageous to provide the stator system with an electromagnet, as an additional possibility to control the damping of the independent wheel suspension by means of the strength of the magnetic field of the stator. The electrical energy generated, which is output in pulse form with strongly fluctuating voltage values, may be modified, for example, by means of an inverter, and fed to the vehicle electrical system.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
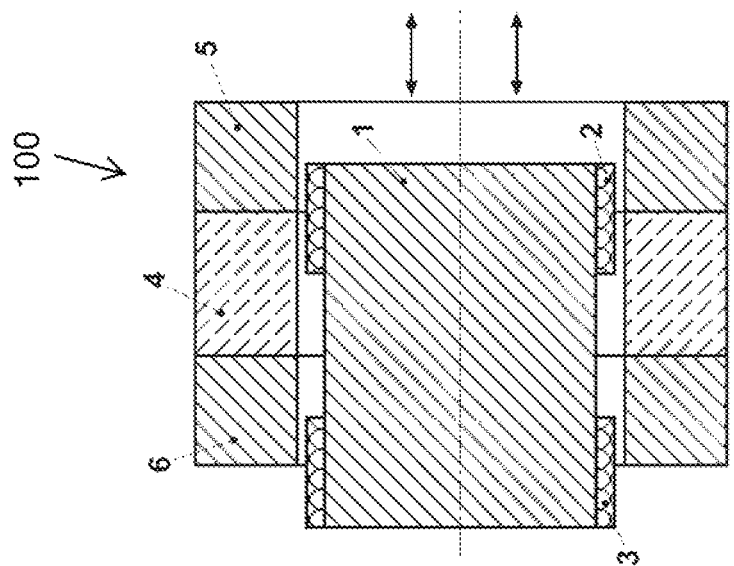
FIG. 1 is a cross-sectional view of a linear oscillating motor according to the invention, showing the oscillating system in the center position.
Figure 2:
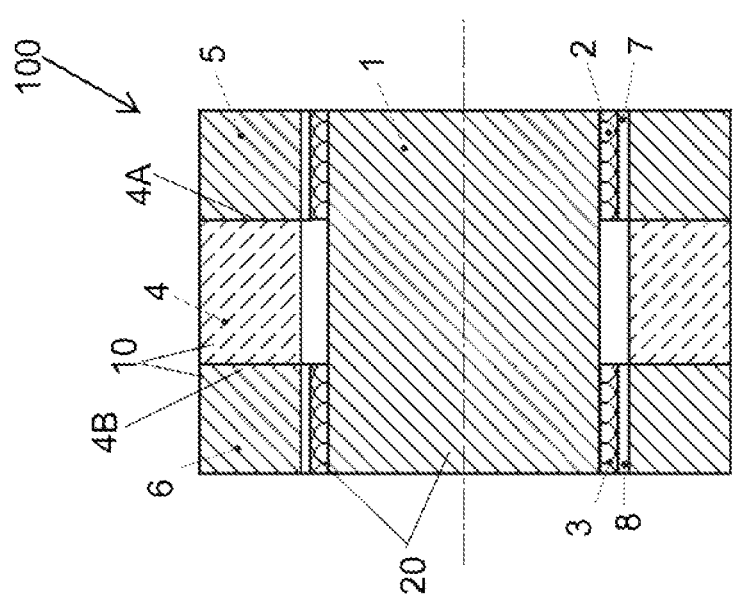
FIG. 2 is a cross-sectional view of the linear oscillating motor of FIG. 1, showing the oscillating system displaced.

FIGS. 1 and 2 are schematic illustrations in cross-section of a linear oscillating motor 100 according to the invention, in an embodiment constructed for a typical small refrigeration compressor. This particular embodiment of the linear oscillating motor is for illustration purposes and is not intended to be limiting to the scope of the invention.

The linear oscillating motor 100 comprises a stator system 10 and an oscillating system 20. The stator system 10 comprises an annular annular-disk-shaped permanent magnet or electromagnet 4, a first ring-shaped pole disk 5 and a second 6 ring-shaped pole disk. The permanent magnet or electromagnet 4 is magnetized in an axial direction and the two pole disks 6, 6 are located at the respective two end faces 4A and 48 of the magnet 4. The axial direction is indicated by the arrows in FIG. 2. The internal and outer diameters of the pole disks 5, 6 correspond to the internal and outer diameters of the magnet 4.

The oscillating system 20 comprises a ferrite core 1, onto which a first drive coil 2 and a second drive coil 3 are wound. The oscillating system 20 is concentric and supported such that it can move in the axial direction inside the stator system 10. When the oscillating system 20 is centered in the stator system 10, the first coil 2 is centered in a first magnet gap 7 and the second coil 3 is centered in a second magnet gap 8. The movable power supply leads for the coils 2, 3 are made of a fatigue-free material and are routed such that they are subject to only minimal bending. Suitable materials for the ferrite core 1 are soft iron, dynamo iron, or soft magnetic construction steel.

To operate the linear oscillating motor 100, an AC voltage is applied to the drive coils 2, 3, thereby producing an alternating electric current through the coils 2, 3. Because the coils are in the magnetic field of the stator system 10, the energized coils are subjected to Lorentz forces, the magnitude and direction of which are dependent on the magnitude and polarity of the applied operating voltage. The orientation of the windings of the two drive coils 2, 3 is such that the Lorentz forces acting on the coils 2, 3 are cumulative when the motor is operated, and, thus, the applied AC voltage effects an oscillation of the oscillating system 20 at the same frequency as that of the AC voltage.

The linear oscillating motor operates at a frequency of 50 Hz, possesses a stroke of 10 mm, and delivers a mechanical power of 100 W with an efficiency of approx. 87%. It was a surprising discovery that, during operation of the motor, the magnetic field of the stator system 10 remains practically unaffected by the motion of the oscillating system 20. In particular, it can be excluded that the field lines follow the motion of the oscillating system, which would result in a reduction of the drive power.

It is understood that the embodiments described herein are merely illustrative of the present invention. Variations in the construction of the linear oscillating motor may be contemplated by one skilled in the art without limiting the intended scope of the invention herein disclosed and as defined by the following claims.

What is claimed is:

1. An electrodynamic linear oscillating motor powered by AC voltage applied to drive coils; the motor comprising:
   a stator system for generating a magnetic field, the stator system having a single annular disk-shaped permanent magnet, magnetized in an axial direction and having two end faces, with a ring-shaped pole disk made of magnetically soft material provided at each of the two end faces, each of the pole disks forming a magnet gap in conjunction with the annular disk-shaped permanent magnet; and
   an oscillating system concentrically mounted inside the stator system such that the oscillating system is movable in the axial direction between a center position and a displaced position, the oscillating system having at least one core constructed of magnetically soft material onto which two separate drive coils are wound, the two drive coils being arranged such that, when the oscillating system is in the center position, the two drive coils are each centered in one of the magnet gaps;
   wherein the annular disk-shaped permanent magnet has an inner diameter and an outer diameter, the pole disks have an inner diameter and an outer diameter, and the inner and outer diameters of the pole disks are identical to the inner and outer diameters of the annular disk-shaped permanent magnet;
   wherein the length of the core of the oscillating system along the axial direction is equal to the length of the stator system along the axial direction and, when the drive coils are de-energized, the oscillating system with the core and the two drive coils is returned to the center position by way of a reluctance force acting on the oscillating system, without use of a mechanical reset system; and
   wherein, during operation, the oscillating system oscillates at a frequency corresponding to a frequency of the AC voltage.

2. The linear oscillating motor of claim 1, wherein the magnet of the stator system is an electromagnet.

3. The linear oscillating motor of claim 1, wherein the core of the oscillating system is made of a ferrite.

4. The linear oscillating motor of claim 1,
   wherein the orientation of the windings of the two drive coils is opposite each other, such that the Lorentz forces acting on the coils are cumulative during operation of the motor.

5. The linear oscillating motor of claim 4, wherein the core of the oscillating system is cylindrical in form and the outer diameter of the oscillating system, including the core and the coils wound onto the core, is smaller than the inner diameter of the annular-disk-shaped magnet of the stator system.

6. The linear oscillating motor of claim 4, wherein the oscillating system is supported so as to execute a stroke, the length of which corresponds approximately to a length extending in the axial direction of the inner diameter of the annular-disk-shaped magnet.

7. The linear oscillating motor of claim 4, wherein an executable stroke of the oscillating system has a length of 10 to 20 mm.

8. The linear oscillating motor of claim 1, wherein the oscillating system operates at a frequency of approx. 50 Hz.

9. The linear oscillating motor of claim 1, used as the drive motor for a reciprocating compressor for refrigeration and air-conditioning systems.

10. The linear oscillating motor of claim 1, used as a drive motor for a pump for fuel, engine oil, cooling water, or hydraulic fluid in a motor vehicle.

11. The linear oscillating motor of claim 1, used to control the injection of fuel in combustion engines.

12. The linear oscillating motor of claim 1, used as a drive motor for single- or dual-piston linear compressors in gas refrigeration machines that generate very low temperatures.

13. The linear oscillating motor of claim 1, used as a generator for generating electrical energy from drive systems with high power and short stroke.

14. The linear oscillating motor of claim 1, used as a current generator in an electrodynamic damping system for independent suspension of motor vehicles.

* * * * *